(12) United States Patent
Bolinth et al.

(10) Patent No.: US 9,083,416 B2
(45) Date of Patent: Jul. 14, 2015

(54) COMBINING IN RECEIVE DIVERSITY SYSTEMS

(75) Inventors: Edgar Bolinth, Korschenbroich (DE); Herbert Dawid, Herzogenrath (DE); Thorsten Clevorn, Munich (DE); Markus Jordan, Gelsenkirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/528,137

(22) Filed: Jun. 20, 2012

(65) Prior Publication Data
US 2013/0343494 A1 Dec. 26, 2013

(51) Int. Cl.
| | |
|---|---|
| H04B 7/08 | (2006.01) |
| H04B 7/12 | (2006.01) |
| H04B 1/7115 | (2011.01) |
| H04B 7/06 | (2006.01) |

(52) U.S. Cl.
CPC ............ *H04B 7/0885* (2013.01); *H04B 1/7115* (2013.01); *H04B 7/0871* (2013.01); *H04B 7/0669* (2013.01)

(58) Field of Classification Search
CPC ...... H04B 7/0837; H04B 7/0845; H04B 7/12; H04B 7/0871; H04B 7/0885; H04B 7/0669; H04B 7/0817; H04B 1/006; H04B 1/005; H04B 1/7115; H04L 25/067; H04W 88/06; H04W 72/02
USPC ......... 375/148, 147, 140, 130, 267, 260, 259, 375/316; 455/130, 338, 334
See application file for complete search history.

(56) References Cited

U.S. PATENT DOCUMENTS

| | | | | |
|---|---|---|---|---|
| 7,248,645 | B2 * | 7/2007 | Vialle et al. | 375/299 |
| 7,991,378 | B2 * | 8/2011 | Lindoff et al. | 455/334 |
| 8,204,534 | B2 * | 6/2012 | Kawagishi et al. | 455/522 |
| 8,446,975 | B2 * | 5/2013 | Guess et al. | 375/267 |
| 8,599,803 | B1 * | 12/2013 | Zhang et al. | 370/338 |
| 2003/0227882 | A1 * | 12/2003 | Czaja et al. | 370/329 |
| 2003/0235167 | A1 * | 12/2003 | Kuffner | 370/335 |
| 2007/0071150 | A1 * | 3/2007 | Yang et al. | 375/347 |
| 2008/0220819 | A1 * | 9/2008 | Ben-Eli | 455/561 |

(Continued)

OTHER PUBLICATIONS

3GPP TS 25.223 V9.0.0 (Dec. 2009), Technical Specification, $3^{rd}$ Generation Partnership Project; Technical Specification Group Radio Access Network; Spreading and modulation (TDD) (Release 9) 2009.*

(Continued)

*Primary Examiner* — Chieh M Fan
*Assistant Examiner* — Michelle M Koeth
(74) *Attorney, Agent, or Firm* — Eschweiler & Associates, LLC

(57) ABSTRACT

A receiver apparatus includes a first receiver having an input for receiving a first version of a signal received by a first receive antenna. The receiver apparatus further includes a second receiver having an input for receiving a second version of the same signal received by a second receive antenna. The first receiver includes a first constellation demapper for demapping constellation symbols generated in the first receiver into a first soft decision bitstream and the second receiver includes a second constellation demapper for demapping constellation symbols generated in the second receiver into a second soft decision bitstream. A combiner is configured to combine the first soft decision bitstream and the second soft decision bitstream to provide a combined soft decision bitstream.

10 Claims, 5 Drawing Sheets

(56) References Cited

U.S. PATENT DOCUMENTS

| | | | |
|---|---|---|---|
| 2009/0316820 A1* | 12/2009 | Yang | 375/267 |
| 2010/0022212 A1* | 1/2010 | Lindoff et al. | 455/232.1 |
| 2010/0027697 A1* | 2/2010 | Malladi et al. | 375/260 |
| 2011/0002283 A1* | 1/2011 | Drugge et al. | 370/329 |
| 2011/0173508 A1* | 7/2011 | Wehinger | 714/748 |
| 2011/0182329 A1* | 7/2011 | Wehinger | 375/148 |
| 2011/0310877 A1* | 12/2011 | Wu et al. | 370/343 |

OTHER PUBLICATIONS

3GPP TS 25.223 V9.0.0 (Dec. 2009), Technical Specification, 3rd Generation Partnership Project; Technical Specification Group Radio Access Network; Spreading and modulation (TDD) (Release 9) 2009.*

Johansson, K.; Bergman, J.; Gerstenberger, D.; Blomgren, M.; Wallen, A., "Multi-Carrier HSPA Evolution," Vehicular Technology Conference, 2009. VTC Spring 2009. IEEE 69th , vol., no., pp. 1-5, Apr. 26-29, 2009.*

* cited by examiner

COMBINING IN RECEIVE DIVERSITY SYSTEMS

FIELD

The invention relates to the field of radio communications, and more particularly to the technique of detecting signals in radio receiver systems of radio networks, in particular cellular radio networks.

BACKGROUND

Receivers may be equipped with multiple receive antennas to use receive diversity (RxDiv) schemes. When using RxDiv schemes, different antennas receive versions of the same signal for one user, and diversity combining is used at the receiver to improve the signal-to-noise ratio.

Multi-carrier transmission/reception schemes are used to improve the capacity of radio communications systems and to ensure high guaranteed bit rates across large coverage areas. Multi-carrier transmission/reception schemes have been established and stipulated in various standards, among them MC-HSPA (Multi-Carrier High Speed Packet Access). In multi-carrier transmission/reception schemes, multiple receive antennas may be used to receive signals transmitted over different carriers.

BRIEF DESCRIPTION OF THE DRAWINGS

Aspects of the invention are made more evident by way of example in the following detailed description of embodiments when read in conjunction with the attached drawing figures, wherein.

DETAILED DESCRIPTION

Figure 1:
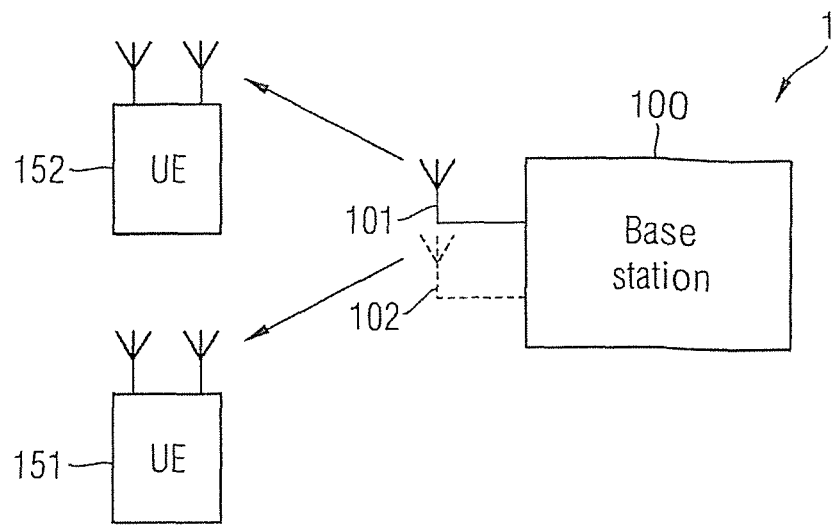
FIG. 1 is a diagram illustrating a radio network system in accordance with the disclosure.

In the following detailed description, reference is made to the accompanying drawings, which form a part thereof, and in which is shown by way of illustration embodiments in which the invention may be practiced. It is to be understood that other embodiments may be utilized and structural or logical changes may be made without departing from the scope of the present disclosure. The following detailed description, therefore, is not to be taken in a limiting sense, and the scope of the present invention is defined by the appended claims.

It is to be understood that the features of the various exemplary embodiments described herein may be combined with each other, unless specifically noted otherwise. Further, like reference numerals designate corresponding identical or similar parts.

As employed in this specification, the terms "coupled" and/or "connected" are not meant to mean in general that the elements must be directly coupled or connected together; intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

It should be understood that embodiments may be implemented in discrete circuits, partially integrated circuits or fully integrated circuits. Further, embodiments may be implemented on a single semiconductor chip or on multiple semiconductor chips connected to each other. Furthermore, it should be understood that embodiments may be implemented in software or in dedicated hardware or partially in software and partially in dedicated hardware.

In the following the terms "mobile station" and "UE" (User Equipment) shall have the same meaning, which meaning shall comprise the definitions given in the various standards (e.g. UMTS, DECT, LTE and derivatives thereof). By way of example, a UE may be represented by a cellular phone, a smartphone, a tablet PC, a laptop, etc. Further, in the following the terms "base station" and "NodeB" shall have the same meaning, which meaning shall comprise the definitions given in the various standards (e.g. UMTS, DECT, LTE and derivatives thereof).

A receiver apparatus as described herein are configured to be equipped with at least two receive antennas to exploit receive diversity (RxDiv). That is, at least in one mode of operation, the at least two different receive antennas receive at least two (different) versions of the same signal for one user, and diversity combining is used at the receiver apparatus to improve the signal-to-noise ratio. In accordance with the disclosure, diversity combining may be accomplished on the basis of soft decision bitstreams associated with the different receive antennas.

A receiver apparatus as described herein may optionally be a multi-carrier radio receiver apparatus. Such a multi-carrier radio receiver apparatus comprises at least two receivers, wherein each receiver is associated with one of at least two carriers, i.e. channel frequencies. In at least one mode of operation, the multi-carrier receiver apparatus may be reconfigured to operate in a RxDiv mode in which at least one of the receivers for the different carriers is reconfigured to receive one of the signal versions of the one user signal received at the different antennas.

By way of example, the radio communications system may be a CDMA (Code Division Multiple Access) system, e.g. a cellular radio communications system such as, e.g., UMTS (Universal Mobile Telecommunications System) including developments such as, e.g., HSPA (High Speed Packet Access). By way of example, the cellular radio communications system may be a WCDMA (Wideband CDMA) system defined by the 3GPP ($3^{rd}$ Generation Partnership Project). The radio communications system may also e.g. be a DECT (Digital Enhanced Cordless Telecommunications) system.

Transmit diversity, also referred to as TxDiv in the art, may be used on downlink physical channels allocated to a UE comprising a receiver apparatus as described herein. TxDiv systems use transmitters having multiple transmit antennas. By way of example, STBCs (Space Time Block Codes) or SFBCs (Space Frequency Block Codes) are used to transmit multiple copies of a data stream across a number of transmit antennas to exploit the redundancy of the various received versions of the data to improve the reliability of data transfer.

MIMO (Multiple Input Multiple Output) schemes as applicable to the transmission/reception systems described herein involve multiple transmit antennas available at the radio base station and multiple receive antennas available at the UE to increase data rates and overall capacity. A MIMO system uses the antennas at the transmitter and the receiver to create multiple uncorrelated radio links (often referred to as "streams") between the transmitter and receiver. These streams may use the same time and frequency resources, enabling capacity to be increased e.g. without an increase in spectrum. Recently, MIMO has been established in various standards, among them HSPA (High Speed Packet Access).

By way of example, in 3GPP Release 7, MIMO operation has been included. Further by way of example, in 3GPP Release 8, multi-carrier operation in the form of dual-carrier HSDPA (High Speed Downlink Packet Access) with downlink transmission on two adjacent 5 MHz carriers has been included. Dual-carrier operation in 3GPP Release 8, also known as DC-HSDPA (Dual-Cell HSDPA), involves two cells which belong to the same base station (NodeB). In 3GPP Release 8, the two cells operate with a single transmit antenna, i.e. MIMO is excluded from the DC-HSDPA operation as stipulated in 3GPP Release 8. Further to 3GPP Release 8, the two cells operate in the same frequency band. More specifically, the DC-HSDPA operation in 3GPP Release 8 uses adjacent 5 MHz carriers in the 900 MHz frequency band or in the 2100 MHz frequency band. In this connection, the contents of 3GPP TS 25.308 "High Speed Downlink Packet Access (HSDPA); Overall description; Stage 2 (Release 8)", V8.4.0 (2008-12) are incorporated herein by way of reference.

In general, multi-carrier operation may be combined with MIMO operation and/or with carriers spaced apart and/or residing in different frequency bands. By way of example, DC-HSDPA can be combined with MIMO, see e.g. 3GPP Release 9. Further, the concept of DC-HSDPA may be extended to multi-carrier HSDPA. By way of example, four carriers may be used, see e.g. 3GPP Release 10. Further, carriers from different frequency bands may be used. By way of example, one carrier (e.g. 5 MHz) of the 900 MHz frequency band and one carrier (e.g. 5 MHz) of the 2100 MHz frequency band may be used.

In FIG. 1 an exemplary radio network system 1 is shown, e.g. one of the above-mentioned systems. The radio network system 1 may be a cellular radio network system 1. The radio network system 1 may include a base station (NodeB) 100 and a plurality of user terminals, which are referred to as UEs 151, 152 in the following.

Typically, different users may be associated with different UEs 151, 152. UEs 151, 152 of different users may be located remote from each other, e.g. near a center and at a border of a cell. That is, different transmit powers may be used by a transmitter apparatus located in a base station 100 to serve the different users.

The base station 100 may comprise one or more antennas 101, 102 for radio communication with the UEs 151, 152. Some of the UEs, e.g. UE 151, served by the base station 100 may have one receive antenna, i.e. in these UEs, no RxDiv operation is possible. One or more or all of the UEs, e.g. UE 152, may have two or more receive antennas, i.e. RxDiv operation and, optionally, MIMO operation may be possible.

The radio network system 1 may use or may not use a transmit diversity (TxDiv) scheme in the downlink. If a TxDiv scheme is used, the base station 100 uses two or more transmit antennas 101, 102 for transmitting a user signal. In this case, the radio network system 1 may optionally use MIMO. If no TxDiv scheme is used, the base station 100 may use only one transmit antenna 101 for transmitting a user signal.

The radio network system 1 may optionally be a multi-carrier radio system. That is, in the base station 100 information for one user (e.g. one UE) may be mapped onto at least two different channel frequencies (carriers) f1 and f2 and transmitted simultaneously over these at least two different carriers to the dedicated UE 152.

Figure 2:
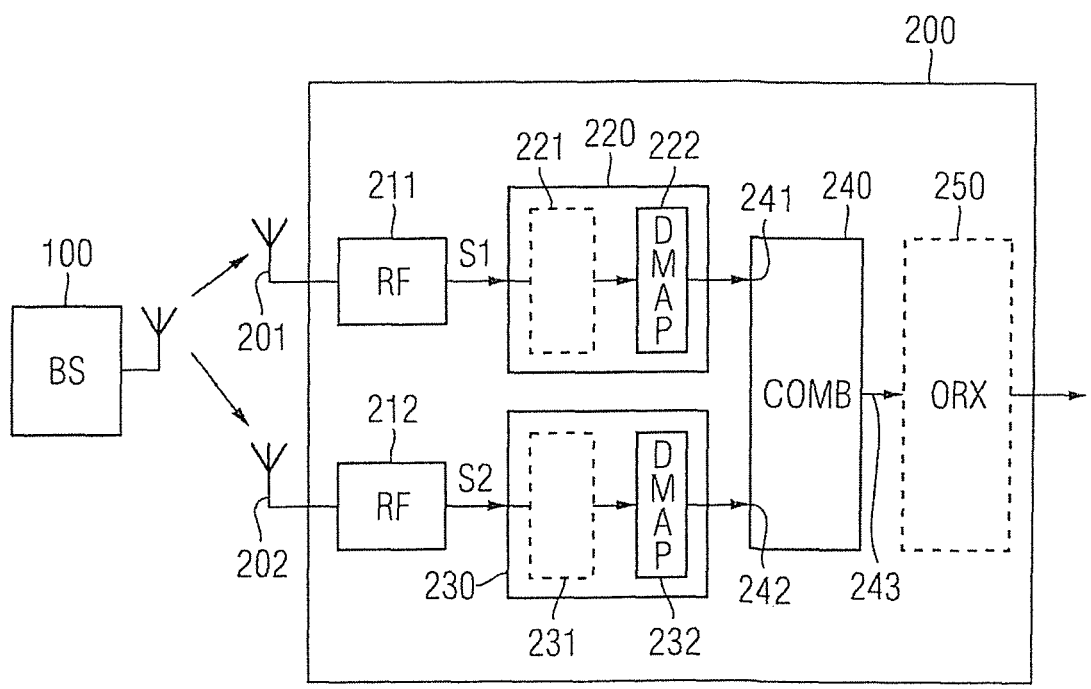
FIG. 2 is a block diagram illustrating an exemplary implementation of a radio receiver apparatus in accordance with the disclosure.

According to FIG. 2, a receiver apparatus 200 may be coupled to two or more receive antennas 201, 202. The receiver apparatus 200 may e.g. be implemented in UE 152. The first and second receive antennas 201, 202 may receive versions of one user signal dedicated to UE 152 and transmitted by the base station 100.

The receiver apparatus 200 may comprise a first RF unit 211 and a first receiver 220 having an input coupled to an output of the first RF unit 211. The receiver apparatus 200 may further comprise a second RF unit 212 and a second receiver 230 having an input coupled to an output of the second RF unit 212. The receiver apparatus 200 comprises a combiner 240 and, optionally, a channel decoder 250 (which is also referred to as an outer receiver (ORX) in the art). An output of the first receiver 220 may be coupled to a first input 241 of the combiner 240. An output of the second receiver 230 may be coupled to a second input 242 of the combiner 240. An output 243 of the combiner 240 may be coupled to an input of the channel decoder 250.

In operation, the first RF unit 211 may receive a first input signal from antenna 201. The first input signal may be processed in the first RF unit 211 by applying conventional techniques such as, e.g. filtering, down-conversion, analog-to-digital conversion and so on. At the output of the first RF unit 211, data samples of a first signal version S1 of one user signal transmitted by base station 100 and received at the first receive antenna 201 are provided.

The second RF unit 212 may receive a second input signal from antenna 202. The second input signal may e.g. be processed in the second RF unit 212 the same way as the first input signal is processed in the first RF unit 211. In particular, the same down-conversion frequency may be used for down-conversion. At the output of the second RF unit 212, data samples of a second signal version S2 of the same user signal are provided. The second signal version S2 is the signal version of the user signal as received at antenna 202. Thus, the first and second signal versions S1 and S2 are based on the same coded information, however, the signal versions S1 and S2 are different due to different fading. Thus, signal versions S1 and S2 are usable for receive diversity processing.

The first receiver 220 may comprise a first (optional) equalizer 221 and a first constellation demapper 222. The second receiver 230 may comprise a second (optional) equalizer 231 and a second constellation demapper 232.

The first equalizer 221 may be configured to equalize one or more physical channels used in the wireless communications network. Thus, the first equalizer 221 may use techniques to extract one or more specific physical channels. Further, the first equalizer 221 may use techniques to generate channel estimates and apply the channel estimates to compute equalized symbols from the data samples of the first signal version S1. Equalized (modulated) symbols computed in the first equalizer 221 are provided at the output of the first equalizer 221.

By way of example, the first equalizer 221 may use techniques to distinguish between signal components of the first signal version S1 received over different propagation paths. Such techniques may comprise propagation path delay estimation to identify a propagation path delay profile. In this case, channel estimation may comprise generating channel estimates of individual propagation paths. Techniques such as e.g. signal delaying based on the estimated propagation path delays, descrambling, despreading (i.e. de-channelization), symbol generation, weighting based on the channel estimates and path combining (e.g. maximum ratio combining) may be applied in the first equalizer 221. Other techniques for equalizing may e.g. comprise filtering, matrix inversion and symbol generation. The techniques applied in the first equalizer 221 may depend on the type of the first equalizer 221 and/or on the type of the radio communications network used in the specific application. By way of example, a RAKE equalizer or a LMMSE (Linear Minimum Mean Square Error) equalizer may be used.

Equalizing the received first signal version S1 is not mandatory. In accordance with the disclosure, the first equalizer 221 may be omitted. In some applications such as e.g. DECT systems, equalization of the received signal may not be needed. In place of the equalizer 221, there may remain a unit which generates (modulated) symbols from the samples of the first signal version S1.

The first constellation demapper 222 is configured to demap constellation symbols generated in the first receiver 220 into a first soft decision bitstream. The constellation demapper 222 is also referred to as modulation demapper or symbol demapper or demodulator in the art. The constellation demapper 222 represents the interface between symbol level processing and (soft) bit processing in the first receiver 220. Typically, the constellation demapper 222 receives complex valued symbols in accordance with the modulation scheme applied in the transmitter (base station 100) and outputs the first soft decision bitstream representing the output of the first receiver 220 (e.g. a RAKE or LMMSE receiver).

Soft bit demapping as provided by the first constellation demapper 222 may e.g. use one or more of the modulation modes QPSK (Quadrature Phase-Shift-Keying), QAM (Quadrature Amplitude Modulation), e.g. 16QAM, 64QAM, DPSK (Differential Phase-Shift-Keying), DAPSK (Differential Amplitude Phase-Shift-Keying), etc.

The constellation demapper 222 at the first receiver 220 may perform the complementary operation of a constellation mapper as used in the transmitter. A constellation mapper of the transmitter takes groups of bits and maps them to specific constellation points. A specific magnitude and phase may represent a certain combination of bits. By way of example, a constellation point of 64QAM is characterized by a group of 6 bits. In the constellation demapper 222, in order to decide on the group of bits used in the transmitter, the complex plane is divided into the regions that correspond to each constellation point and the (soft) bit combination of the region in which the received symbol (i.e. detected phase and amplitude, possibly equalized) appears in is output. For soft decision demapping as applied herein, each bit of the demapped group of bits may be assigned a confidence that it will be 0 or 1. The soft information associated with each bit may be calculated by evaluating the values of the in-phase and quadrature components which may represent the symbols received at the input of the constellation demapper 222.

Second RF unit 212 may e.g. be identical or similar to first RF unit 211. Second receiver 230 comprising e.g. second equalizer 231 and second demapper 232 may e.g. be identical or similar to first receiver 220 comprising e.g. first equalizer 221 and first demapper 222. Therefore the above disclosure to the parts 211, 220, 221, 222 of the first detector chain may equally apply to the corresponding parts 212, 230, 231, 232 of the second detector chain, and reiteration of the above description is omitted for the sake of brevity.

The combiner 240 receives the first soft decision bitstream at first input 241 and receives the second soft decision bitstream at second input 242. The combiner 240 is configured to combine the first soft decision bitstream and the second soft decision bitstream to provide a combined soft decision bitstream. The combiner 240 provides diversity combining, i.e. the reliability of the soft bits of the combined soft decision bitstream generated in the combiner 240 benefits from the RxDiv gain available at the receiver apparatus 200.

Soft bits may be provided in different representations. By way of example, soft bits may be represented by LLRs (log likelihood ratios). Other soft information formats may also be used.

In general, the receiver apparatus 200 may be coupled to a number of N receive antennas 201, 202, . . . , where N is an integer equal to or greater than 2. Further, the receiver 200 may comprise a number of N RF units 211, 212, . . . coupled to the respective antennas, a number of N receivers 220, 230, . . . coupled to the respective RF units and the combiner 240 may have a number of N inputs 241, 242, . . . .

The combiner 240 may use different schemes to combine the (at least) two soft decision bitstreams received at inputs 241, 242. By way of example, the combiner 240 may comprise an adder. Optionally, the combiner 240 may comprise scaling units at the inputs of the adder and/or a scaling unit at the output of the adder.

Figure 3:
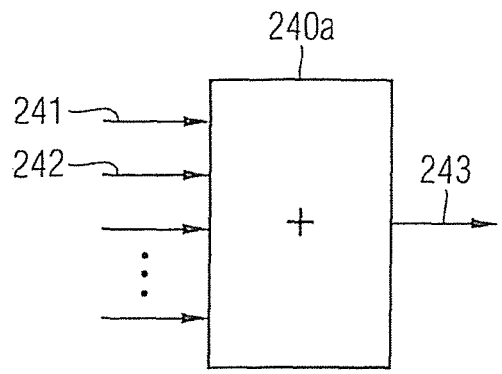
FIG. 3 is a block diagram illustrating an exemplary implementation of a diversity combiner in accordance with the disclosure.

As illustrated by way of example in FIG. 3, in a simple implementation, the combiner 240a may be represented by an adder. As mentioned above, the input soft decision bitstreams and/or the combined output soft decision bitstream may be scaled before and/or after combining, respectively, by appropriate scaling factors.

Figure 4:
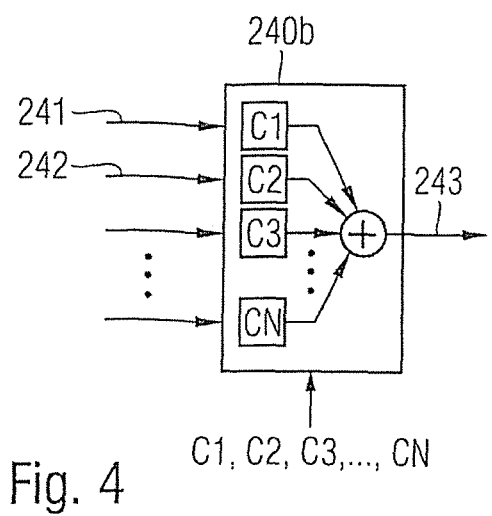
FIG. 4 is a block diagram illustrating an exemplary implementation of a diversity combiner in accordance with the disclosure.

As illustrated by way of example in FIG. 4, the combiner 240b may be configured to weight the input soft decision bitstreams before combining by weights c1, c2, c3, . . . , cN. Each weight c1, c2, c3, . . . , cN may be associated with one input soft decision bitstream. Each weight c1, c2, c3, . . . , cN may be variable and/or may be updated from time to time. By way of example, the weights may be computed based on (e.g. as a function of) the SNRs (signal-to-noise ratios) associated with the respective soft decision bitstreams or/and based on (e.g. as a function of) the (e.g. reciprocal) noise and interference powers associated with the respective soft decision bitstreams. SNRs and/or noise and interference powers associated with the respective soft decision bitstreams may e.g. be obtained by measurements of the corresponding signal powers and/or the corresponding noise and interference powers.

Figure 5:
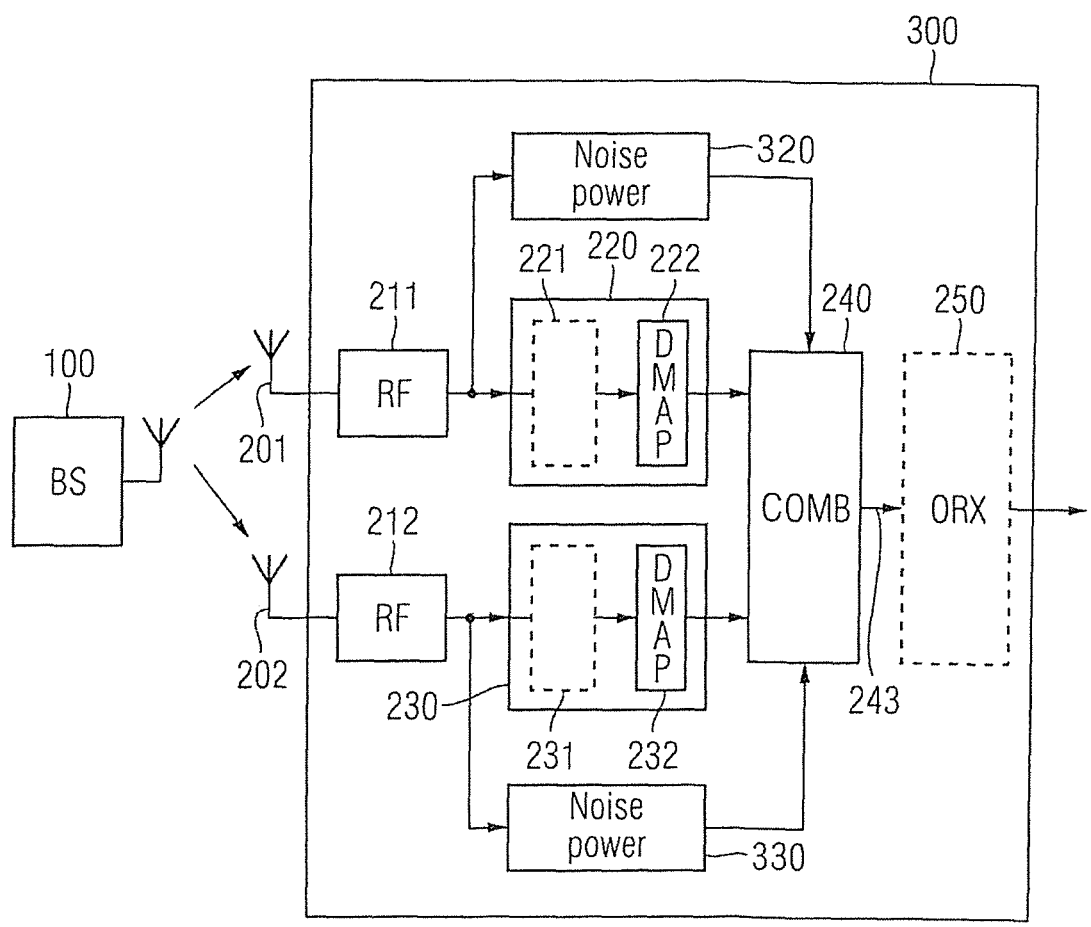
FIG. 5 is a block diagram illustrating an exemplary implementation of a radio receiver apparatus in accordance with the disclosure.

Receiver apparatus 300 as illustrated in FIG. 5 may comprise a first noise power estimator 320 and a second noise power estimator 330. The first noise power estimator 320 may have an input coupled to an output of the RF unit 211, and the second noise power estimator 330 may have an input coupled to an output of the RF unit 212. Further, an output of the first noise power estimator 320 may be coupled to an scaling input of the combiner 240 and an output of the second noise power estimator 330 may be coupled to a scaling input of the combiner 240.

The combiner 240 may be implemented according to combiner 240b as illustrated in FIG. 4. Thus weights c1, c2, . . . , are set based on the noise power measurements carried out in the first and second noise power estimators 320, 330, respectively. By way of example, the weights c1, c2, . . . , may be set to the reciprocal noise powers as measured. Further, or alternatively, the signal powers of the soft decision bitstreams as combined by the combiner 240, may be measured and the weights c1, c2, . . . , may be set based on the SNRs associated with the respective soft decision input bitstreams.

As to the design of the receiver apparatus 300, reference is made to the description of the receiver apparatus 200, which is also applicable to FIG. 5.

Figure 6:
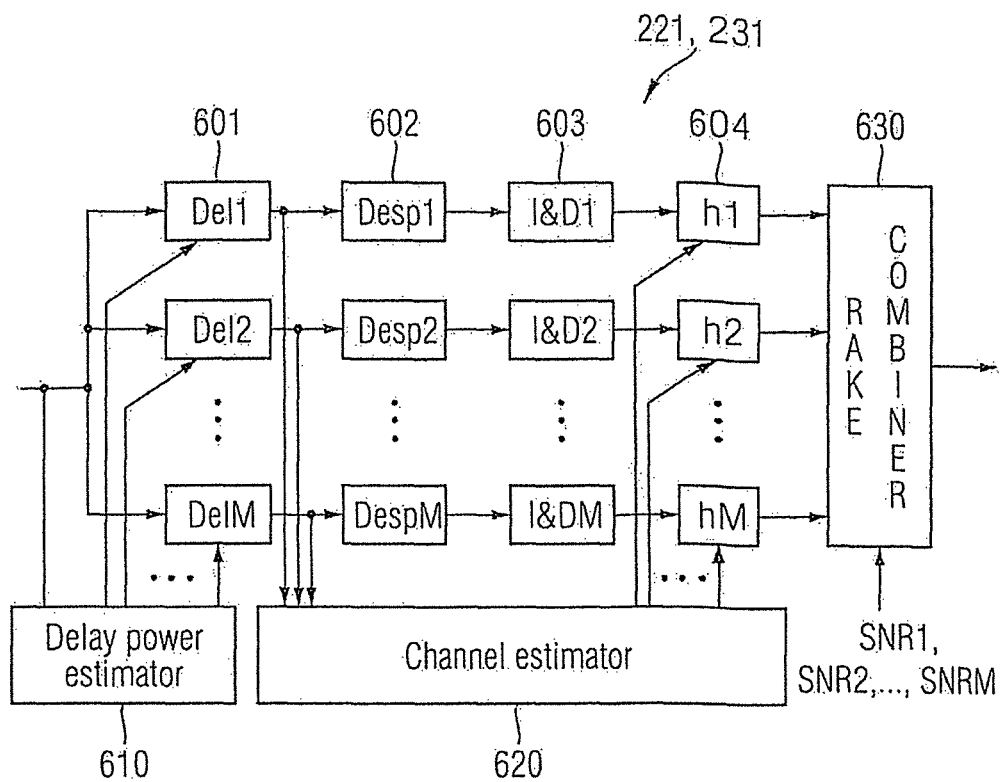
FIG. 6 is a block diagram illustrating an exemplary implementation of an equalizer in accordance with the disclosure.

According to FIG. 6, an equalizer 221, 231 may e.g. be designed as a RAKE equalizer. A RAKE equalizer 221, 231 comprises a number of M correlators, where M is an integer equal to or greater than 2. Each correlator is often called a RAKE receiver finger in the art. By way of example, each RAKE receiver finger may comprise a delay unit 601, a despreader 602, an integrate-and-dump unit 603 and a weighting unit 604. Further, the RAKE equalizer 221, 231 may comprise a delay power estimator 610, a channel estimator 620 and a RAKE combiner 630.

The delay power estimator 610 may evaluate the power profile of the incoming signal, which is a stream of data samples. By delay units 601, each RAKE finger is set to a specific propagation path delay. De-channelization, i.e. the extraction of a specific physical channel, may be performed in despreaders 602. The integrate-and-dump unit 603 may be used to generate symbols from a specific number of data samples. By way of example, if each data sample corresponds to a half-chip (i.e. if the sampling frequency is twice the chip frequency), the integrate-and-dump units 603 may integrate a number of 2·SF data samples to compose a symbol, where SF is the spreading factor applied to the corresponding physical channel.

The symbols output from the integrate-and-dump units 603 may be weighted based on appropriate channel estimates h1, h2, . . . , hM computed by channel estimator 620. The symbols output by the weighting units 604 are equalized symbols associated with a specific physical channel and an individual propagation path.

The RAKE combiner 630 performs combining based on symbols. The RAKE combiner 630 performs propagation path combining. As will be described in more detail below (see e.g. FIG. 8), the RAKE combiner 630 may optionally also perform RxDiv combining in case the input data samples to the RAKE equalizer 221, 231 are provided by a plurality of receive antennas. However, different from the combiner 240, the RAKE combiner 630 operates on symbol streams rather than on demodulated (i.e. demapped) data in the form of soft decision bitstreams.

The RAKE combiner 630 may be a MRC (Maximum Ratio Combiner). In this case, signal-to-noise ratios SNR1, SNR2, . . . , SNRM associated with the corresponding RAKE fingers are applied to achieve optimum linear combining.

Figure 7:
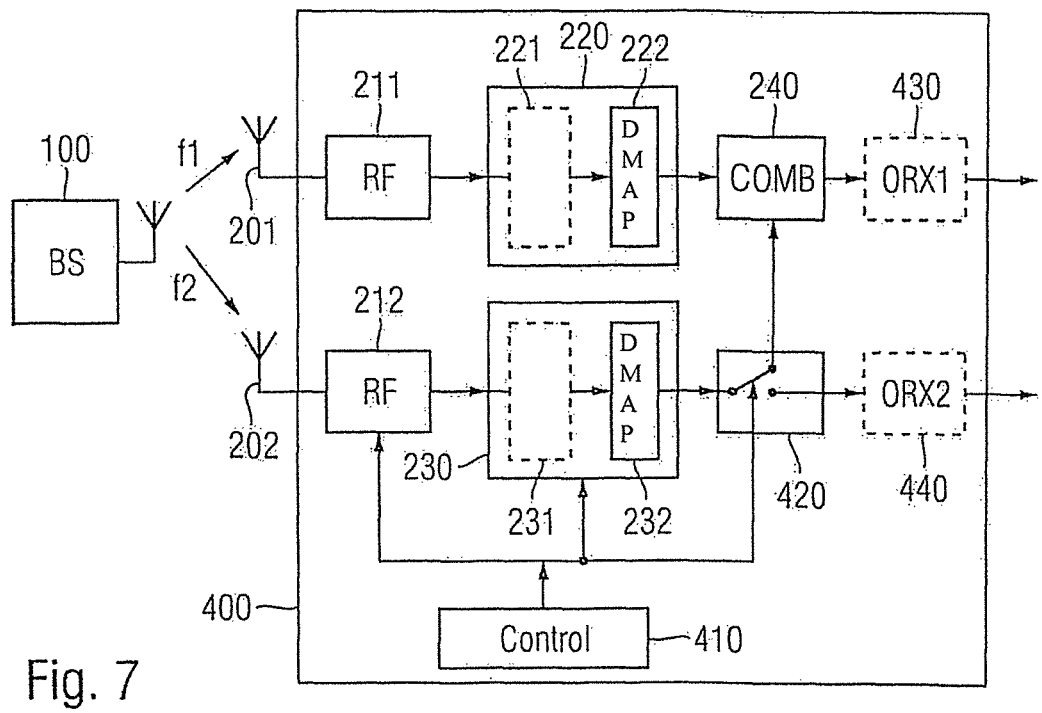
FIG. 7 is a block diagram illustrating an exemplary implementation of a radio receiver apparatus in accordance with the disclosure.

In FIG. 7, an example of an implementation of an MC receiver apparatus 400 is illustrated. Without loss of generality, an MC receiver apparatus 400 is described in the following. The MC receiver apparatus 400 may comprise a first detector chain comprising parts 211, 220, 221, 222, a second detector chain comprising parts 212, 230, 231, 232, and a combiner 240. The first and second detector chains and the combiner 240 may be configured in accordance with the description herein. Further the receiver apparatus 400 may comprise a control unit 410, a switch 420, optionally a first channel decoder 430 and optionally a second channel decoder 440.

The control unit 410 may be configured to control parts of the second detector chain, e.g. the second RF unit 212, the second receiver 230 and the switch 420. The first channel decoder 430 may be identical to the channel decoder 250 as described herein.

In a first mode of operation, the user signal is transmitted over two carriers, i.e. two different channel frequencies f1, f2. The first RF unit 211 may be used to process the signal carried over the first carrier frequency f1. That is, the RF unit 211 may use a down-conversion frequency based on or identical to the first carrier frequency f1. The second RF unit 212 may be configured to simultaneously process a signal carried over the second carrier frequency f2. That is, the second RF unit 212 may use a down-conversion frequency based on or identical to the second carrier frequency f2. Thus, the RF units 211, 212 may use different down-conversion frequencies during the multi-carrier (here: dual-carrier) mode of operation.

By way of example, the receiver apparatus 400 may be a MC-HSPA receiver apparatus in accordance with one of the HSPA standards mentioned above. The first detector chain 211, 220, 221, 222 together with channel decoder 430 may be used to demodulate and decode physical channels transmitted via the first carrier frequency f1. To that end the first receiver 220 may comprise one or more of a CPICH (Common Pilot CHannel) demodulator for pilot demodulation, a PICH (Paging Indicator CHannel) demodulator, a PCCPCH (Primary Common Control Physical CHannel) demodulator, a SCCPCH (Secondary Common Control Physical CHannel) demodulator for control data demodulation such as, e.g., PCH (Paging CHannel) demodulation in case a PI (Paging Indicator) is detected by the PICH demodulator, a DPCH (Dedicated Physical CHannel), a F-DPCH (Fractional Dedicated Physical CHannel) demodulator, and an HSUPA (High Speed Uplink Packet Access) demodulator demodulating the corresponding RGCH (Relative Grant CHannel), HICH (Hybrid ARQ Indicator CHannel) and AGCH (Absolute Grant CHannel).

In a HSPA receiver, the second receiver 230 is needed when there is an active MC-HSPA connection, e.g. DC-HSDPA and/or DC-HSUPA (Dual Cell High Speed Uplink Packet Access). In DC-HSDPA, the second receiver 230 is needed at least for the reception of the F-DPCH on the second carrier to provide power control information for the dual carrier HSDPA cell. In DC-HSUPA, the receiver apparatus 400 may need the two receivers 220, 230 to demodulate the corresponding (different) HSUPA control channels.

Generally, the second receiver 230 may be a duplicate of the first receiver 220. The second receiver 230 may also be a reduced receiver. By way of example, referring again to HSPA, a reduced receiver 230 may contain a number of demodulators which are needed for dual carrier HSPA capability, namely a CPICH demodulator for pilot demodulation, a FDPCH demodulator and an HSUPA demodulator demodulating the corresponding RGCH, HICH and AGCH.

During a MC (e.g. DC) mode of operation, the two detector chains 211, 220, 221, 222 and 212, 230, 231, 232 are operated in parallel to demodulate appropriate physical channels transmitted over the first and second carriers f1, f2. During that mode of operation, the control unit 410 may control at least the second receiver 230 to demodulate the required physical channel(s) and may control the switch 420 to pass the soft decision bitstream provided by demapper 232 to the second channel decoder 440. During the MC mode of operation, the combiner 240 may be disabled. By way of example, assuming the implementation of FIG. 7, the combiner 240 may simply pass the input soft decision bitstream of demapper 222 to the first channel decoder 430.

In a second mode of operation, when there is no active MC (or DC) connection, the control unit 410 may control the second detector chain 212, 230, 231, 232 and the switch 420 to operate the receiver apparatus 400 in a RxDiv mode as explained in conjunction with the above description to FIGS. 1 to 6. In this case, the user signal may be transmitted over only one carrier, e.g. the carrier of frequency f1. The second RF unit 212 is controlled to use a down-conversion frequency based on the carrier frequency f1, e.g. identical to the carrier frequency f1. The second receiver 230 is controlled by control unit 410 to process the second antenna signal as described above. The switch 410 is controlled by control unit 410 to pass the output of the second receiver 230 to the combiner 240. The combiner 240 provides for receive diversity combining based on the at least two soft decision bitstreams as described above. As RAKE combining (e.g. also including RxDiv combining, see FIG. 8) on the basis of (modulated) symbols may be carried out in each of the first and second receivers 220, 230, the combining operation in combiner 240 may also be referred to as post-combining.

It is to be noted that the implementation of the receiver apparatus 400 of FIG. 7 may be modified in many aspects. By way of example, another switch (not shown) may be provided between the output of the first receiver 220 and the input of the combiner 420 in order to bypass the combiner 240 during the first mode of operation. The control unit 410 may be configured to disable the combiner 240 during the first mode of operation and enable the combiner 240 during the second mode of operation.

In other words, the MC receiver apparatus 400, when operated in the second mode of operation, takes advantage of the "additional" detector chain 212, 230, 231, 232 which is reconfigured for use as a RxDiv detector chain. The RxDiv gain of this reconfigured additional detector chain is obtained by soft decision bitstream combining, e.g. post-combining of the outputs of the first and second demappers 222, 232 by combiner 240.

Figure 8:
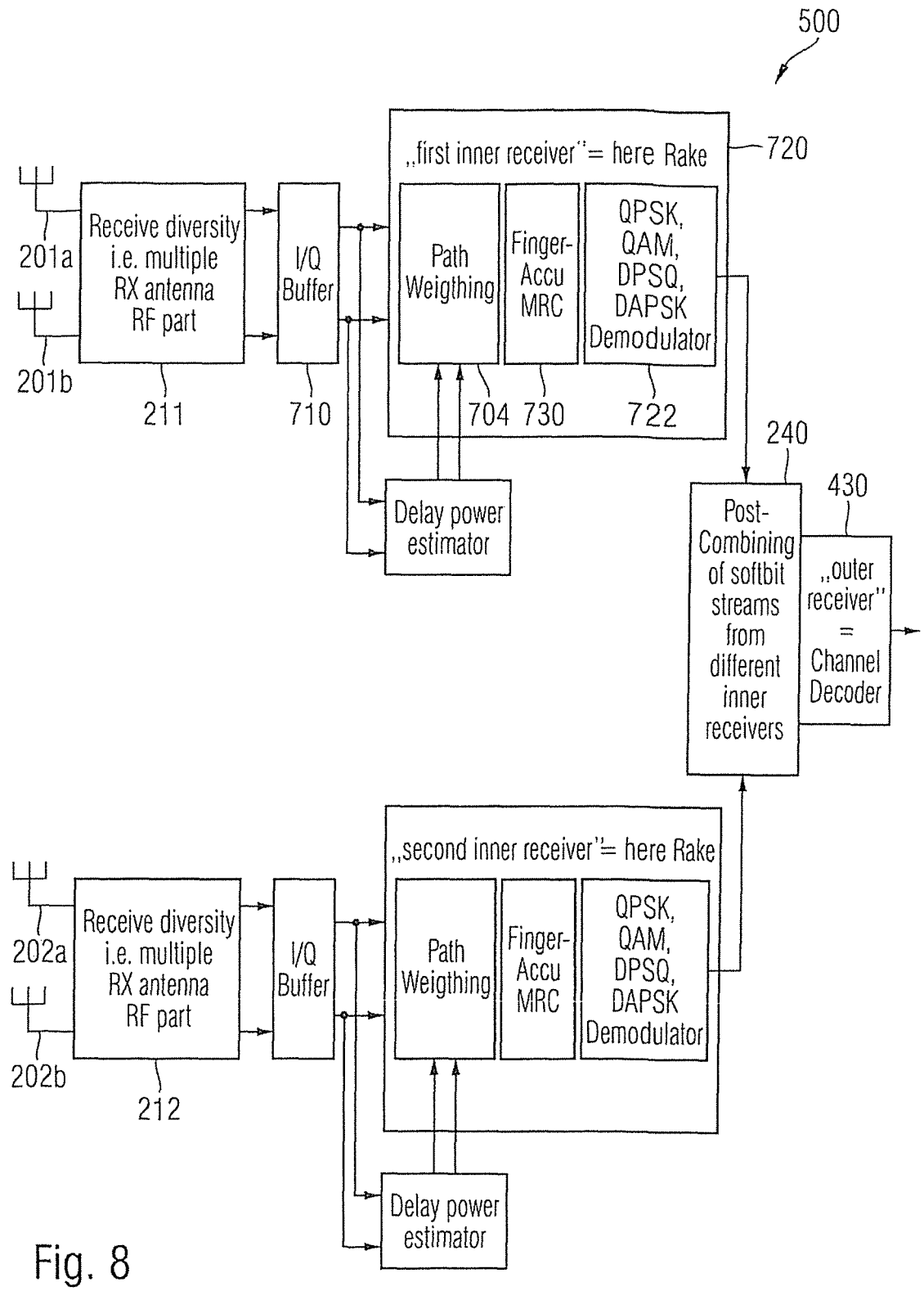
FIG. 8 is a block diagram illustrating an exemplary implementation of a radio receiver apparatus in accordance with the disclosure.

FIG. 8 illustrates an exemplary implementation of a receiver apparatus 500. The receiver apparatus 500 corresponds to a specific implementation of receiver apparatus 200 to 400 and details described below may be used in one or more of the receiver apparatus 200 to 400 described herein. Vice versa, features explained in conjunction with the receiver apparatus 200 to 400 may be used to modify the receiver apparatus 500.

The receiver apparatus 500 may comprise a first receive diversity RF unit 211 and a second receive diversity RF unit 212. Each of the first receive diversity RF unit 211 and the second receive diversity RF unit 212 may be coupled to a plurality of receive antennas 201a, 201b and 202a, 202b, respectively.

Each of the first and second receive diversity RF units 211, 212 may have multiple down-conversion stages (not shown), wherein each of these stages is configured to process a signal associated with one receive antenna 201a, 201b and 202a, 202b, respectively.

Each of the receive diversity RF units 211, 212 may output a number of down-converted antenna signals corresponding to the number of receive antennas. Without loss of generality, in the following, two receive antennas 201a, 201b and 202a, 202b coupled to each detector chain are assumed. Further, for the sake of simplicity, only the first detector chain (comprising the first receive diversity RF unit 211) will be described below, and it may be assumed that the second detector chain (comprising the second receive diversity RF unit 212) may e.g. be an (identical) duplicate detector chain or a reduced detector chain as exemplified above.

The outputs of the receive diversity RF unit 211 are received by an I/Q buffer 710. The I/Q buffer 710 corresponds in function to the delay units 601 as described with reference to FIG. 6.

A first receiver 720, also referred to as a first "inner receiver" may e.g. be configured as a RAKE receiver or LMMSE receiver. In case of a RAKE receiver, the first receiver 720 may comprise a path weighting unit 704 similar to the scaling unit 604 of FIG. 6, a finger-accumulator MRC 730 similar to the RAKE combiner 630 of FIG. 6 and a demodulator 722 similar to the symbol demapper 222 as referred to herein. In this example, the first receiver 720 may comprise a first set of RAKE fingers which are associated with the first antenna signal from receive antenna 201a and a second set of RAKE fingers which are associated with the second antenna signal from receive antenna 201b. RAKE combining in finger accumulator MRC 730 provides for RxDiv gain in view of the receive antennas 201a and 201b. The demodulator 722 may, e.g., perform symbol demapping in accordance with one or more of different modulation schemes such as, e.g., QPSK, QAM, DPSQ, DAPSK, etc.

Post combining in combiner 240 is based on soft decision bitstreams from first and second inner receivers as explained above. Post combining establishes additional diversity gain associated with the receive antennas 202a, 202b coupled to the second detector chain. Channel decoder 430 is used for channel decoding based on the corresponding combined soft decision bitstream.

It is to be noted that all the concepts explained above may be applicable to the receiver apparatus 500. More specifically, by way of example, the receiver apparatus 500 may be a MC receiver, e.g. MC-HSPA receiver, configured to operate in a MC mode where the two detector chains are used to demodulate the different carriers and configured to operate in a RxDiv post-combining mode in which e.g. the second detector chain is reconfigured to provide for additional diversity gain resources in a single carrier operation. For such MC receivers having at least two detector chains, no additional hardware expenditure is needed to reuse one or more of the unused detector chains during single carrier operation for RxDiv gain during the second mode (RxDiv post-combining mode) of operation.

Figure 9:
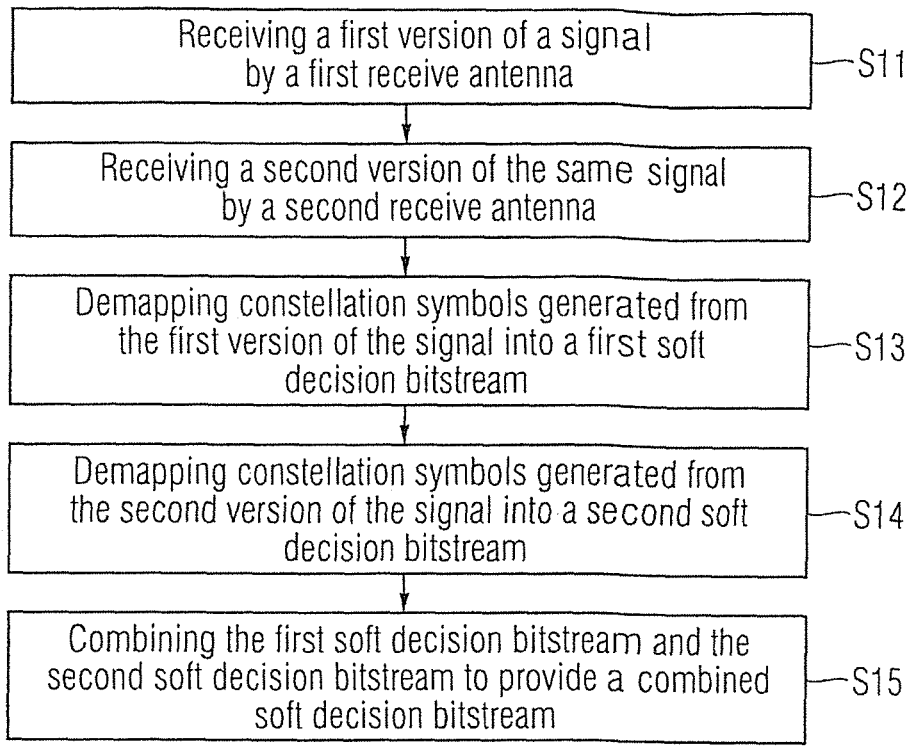
FIG. 9 is a flow chart illustrating an exemplary method in accordance with the disclosure.

FIG. 9 illustrates one exemplary method in accordance with the disclosure. At S11, a first version of a signal is received by a first receive antenna.

At S12, a second version of the same signal is received by a second receive antenna.

At S13, constellation symbols generated from the first version of the signal are demapped into a first soft decision bitstream.

At S14, constellation symbols generated from the second version of the signal are demapped into a second soft decision bitstream.

At S15, the first soft decision bitstream and the second soft decision bitstream are combined to provide a combined soft decision bitstream.

Figure 10:
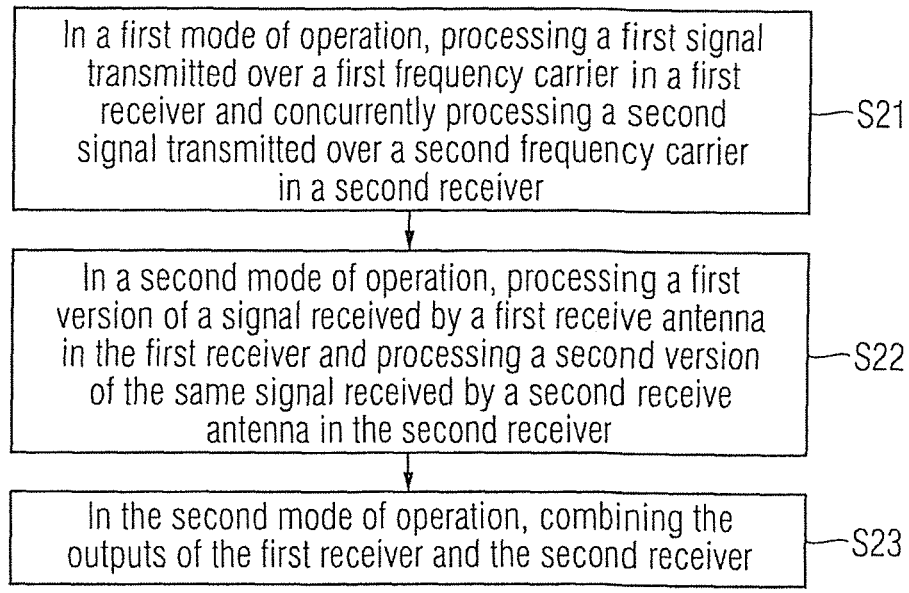
FIG. 10 is a flow chart illustrating an exemplary method in accordance with the disclosure.

According to FIG. 10 an exemplary method in accordance with the disclosure may comprise operating a receiver in a first mode of operation at S21 comprising processing a first signal transmitted over a first frequency carrier in a first receiver and e.g. concurrently processing a second signal transmitted over a second frequency carrier in a second receiver.

The method may further comprise operating a receiver in a second mode of operation at S22 comprising processing a first version of a signal received by a first receive antenna in the first receiver and processing a second version of the same signal received by a second receive antenna in the second receiver.

At S23, in the second mode of operation the outputs of the first receiver and the second receiver are combined.

It is to be noted that the implementations and methods described above are applicable to various standards, among them HSPA, LTE and DECT.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of embodiments described herein. Therefore, it is intended that this invention is limited only by the claims and the equivalents thereof.

What is claimed is:

1. A user equipment apparatus, comprising:
at least two high speed packet access receivers comprising a first receiver and a second receiver configured to receive one or more user signals dedicated to the user equipment;
at least two channel decoders comprising a first channel decoder and a second channel decoder,
wherein, in a multi-carrier receive operation mode, the first receiver and the first channel decoder are configured to process a first signal of the one or more user signals transmitted over a first frequency carrier and the second receiver and the second channel decoder are configured to process a second signal of the one or more user signals transmitted over a second, different frequency carrier, and
wherein, in a receive diversity operation mode, the first receiver is configured to process a first version of a signal of the one or more user signals received by a first receive antenna to output a first soft decision bitstream, the second receiver is configured to process a second version of the same signal received by a second receive antenna to output a second soft decision bitstream, and a combiner is configured to combine the outputs of the first receiver and the second receiver as a weighted combination of the first soft decision bitstream and the second soft decision bitstream;
a switch coupled between an output of the second receiver and the combiner, wherein in the multi-carrier receive operation mode the switch is operable to disable combining of signals from the first and second receivers and to pass a signal from the second receiver to the second channel decoder, and
wherein in the receiver diversity operation mode the switch is operable to enable combining of signals at the combiner from the first and second receivers; and
a control unit configured to control the second receiver to operate on the second frequency carrier in the multi-carrier receive operation mode when there is an active multi-carrier high speed packet access connection at the first receiver or the second receiver and to operate on the first frequency carrier in the receive diversity operation mode when there is no active multi-carrier high speed packet access connection, and further configured to control the operation of the switch.

2. A method, comprising:
operating a user equipment receiver unit in a multi-carrier receive operation mode comprising:
processing a first signal transmitted over a first frequency carrier and dedicated to the user equipment, in a first high speed packet access receiver of the receiver unit;
processing a second signal transmitted over a second, different frequency carrier and dedicated to the user equipment, in a second high speed packet access receiver of the receiver unit;
operating the user equipment receiver unit in a receive diversity operation mode comprising:
processing a first version of a signal received by a first receive antenna in the first high speed packet access receiver of the receiver unit to output a first soft decision bitstream, the signal being dedicated to the user equipment;
processing a second version of the signal received by a second receive antenna in the second high speed packet access receiver of the receiver unit to output a second soft decision bitstream;
selectively combining the outputs of the first receiver and the second receiver as a weighted combination of the first soft decision bitstream and the second soft decision bitstream, at a combiner through a switch at an input thereof, wherein the switch is operable to enable or disable the combining based on a state thereof, wherein the switch disables a combining of signals from the first and second receiver and passes a signal from the second receiver to the second channel decoder in the multi-carrier receive operation mode, and enables a combining of signal as the combiner from the first and second receivers in the receive diversity operation mode; and
controlling with a control unit the second receiver to operate on the second frequency carrier in the multi-carrier receive operation mode when there is an active multi-carrier high speed packet access connection and to operate on the first frequency carrier in the receive diversity operation mode when there is no active multi-carrier high speed packet access connection, and further controlling with the control unit the operation of the switch.

3. The method of claim 2, further comprising:
in the multi-carrier receive operation mode, decoding the output of the first receiver in a first channel decoder and decoding the output of the second receiver in a second channel decoder; and
in the receive diversity operation mode, decoding the combined outputs of the first receiver and the second receiver in one of the first channel decoder and the second channel decoder.

4. The receiver apparatus of claim 1, wherein the active multi-carrier high speed packet access connection comprises a dual carrier high speed digital uplink packet access connection at the first receiver or the second receiver.

5. The receiver apparatus of claim 1, wherein, in the receive diversity operation mode, the first receiver down-converts the first version to a down-conversion frequency and the second receiver down-converts the second version to the same down-conversion frequency.

6. The receiver apparatus of claim 1, wherein the weighted combination of the first soft decision bitstream and the second soft decision bitstream is weighted based on signal-to-noise ratios associated with the first and second soft decision bitstreams.

7. The receiver apparatus of claim 1, wherein the weighted combination of the first soft decision bitstream and the second soft decision bitstream is weighted as a function of at least one of noise powers or interference powers associated with the first and second soft decision bitstreams.

8. The method of claim 2, wherein operating the user equipment receiver unit in the receive diversity operation mode further comprises:
   down-converting the first version to a down-conversion frequency; and
   down-converting the second version to the same down-conversion frequency.

9. The method of claim 2, wherein the weighted combination of the first soft decision bitstream and the second soft decision bitstream is weighted based on signal-to-noise ratios associated with the first and second soft decision bitstreams.

10. The method of claim 2, wherein the weighted combination of the first soft decision bitstream and the second soft decision bitstream is weighted as a function of at least one of noise powers or interference powers associated with the first and second soft decision bitstreams.

* * * * *